E. A. W. JEFFERIES.

ENGINE FOR LOW TEMPERATURE EXPANSION.

APPLICATION FILED NOV. 16, 1918.

Reissued Feb. 25, 1919. 14,597.

Inventor
E. A. W. Jefferies
By Attorney,
Geo. H. Kennedy Jr.

UNITED STATES PATENT OFFICE.

EBENEZER A. W. JEFFERIES, OF WORCESTER, MASSACHUSETTS, ASSIGNOR TO JEFFERIES-NORTON CORPORATION, OF WORCESTER, MASSACHUSETTS, A CORPORATION OF DELAWARE.

ENGINE FOR LOW-TEMPERATURE EXPANSION.

14,597. Specification of Reissued Letters Patent. Reissued Feb. 25, 1919.

Original application filed December 1, 1915, Serial No. 64,429. Renewed January 19, 1918, Serial No. 212,852. Original No. 1,264,871, dated April 30, 1918. Application for reissue filed November 16, 1918. Serial No. 262,878.

*To all whom it may concern:*

Be it known that I, EBENEZER A. W. JEFFERIES, a citizen of the United States, residing at Worcester, in the county of Worcester and Commonwealth of Massachusetts, have invented a new and useful Improvement in Engines for Low-Temperature Expansion, of which the following, together with the accompanying drawings, is a specification.

The present invention relates to improvements in engines used to expand gases to extremely low temperatures, as, for instance, engines of the class known as cold expansion engines which are employed in the liquefaction of air and other gases. My invention is particularly adapted for use in connection with a piston equipped cylinder in which compressed air or other gas, at a low temperature, is still further reduced in temperature, for refrigeration purposes, by expansion, and at the same time is made to expend its energy in producing useful work.

In such engines, of course, ideal conditions of operation are attained when the difference in temperature between the relatively warm gas admitted to the cylinder and the cold gas exhausted from the cylinder, is a maximum. In other words, the efficiency of such engines is dependent upon the attainment of the lowest possible temperature of the gas exhausted from the cylinder. When the gas is surrounded by ordinary metallic cylinder walls, a large amount of heat is absorbed by the metallic surfaces during the admission of the relatively warm compressed gas to the cylinder; upon expansion of the gas, accompanied by a drop in temperature, this heat absorbed by the cylinder walls is given up to the expanding gas, with the result that the theoretical drop in temperature is not attained. With the use of internal metallic surfaces therefore, as in all engines of this class now in use, the above described rapid interchanges of heat between the gas and the metal, involving the alternate absorption and rejection of large quantities of heat by said metal, seriously impair the efficiency of such engines. That is to say, the great amount of heat stored in the metal at each influx of relatively warm gas to the cylinder has the effect of greatly diminishing the natural drop in temperature due to the expansion of said gas, thus defeating, to a considerable extent, the object sought to be attained. It is to be understood that the action above described, which is here sought to be remedied, is wholly an internal action, applying only to the rapid changes of temperature occurring within the cylinder; such changes have no relation to the problem of insulating the cylinder walls from external atmospheric heat, which, of course, can be accomplished in the ordinary way by exterior insulating material, to prevent the passage of heat through said walls.

The principal object of the present invention is to provide, in engines of the class specified, a suitable interior covering for the metallic inclosing surfaces which would otherwise be in contact with the gas during its expansion; said covering or lining being composed of a material whose capacity for quickly absorbing or rejecting heat is extremely small, as compared to metals. By the provision of such a lining, the losses due to the rapid alternate absorption and rejection of heat by the surfaces in contact with the gas are greatly reduced, since the amount of heat so absorbed and rejected will be very small as compared to the amount absorbed and rejected by metallic cylinder walls. It is well known that in ordinary expansion cylinders operating at very low temperatures, that is, temperatures below minus two hundred degrees Fahrenheit, the drop in temperature due to expansion seldom attains more than forty per cent. of the natural or calculated range which should be obtained under perfectly isentropic conditions. On the other hand, in an engine having its gas contacting surfaces equipped with a covering in accordance with my invention, the actual drop in temperature exceeds, in practice, eighty per cent. of the theoretical temperature drop; this action not only increases the efficiency of the engine, but results in other valuable advantages in that it permits the use of lower pressures to obtain the same degrees of cold, thereby greatly simplifying the construction and operation of such refrigerating machinery and other apparatus for the liquefaction of fluids which are gaseous in their free states.

In the accompanying drawings I have represented my invention as applied to a piston equipped cylinder adapted to be used in connection with the liquefaction of air or other gases.

In said drawings.

Similar reference characters refer to similar parts in the different figures.

Figure 1:
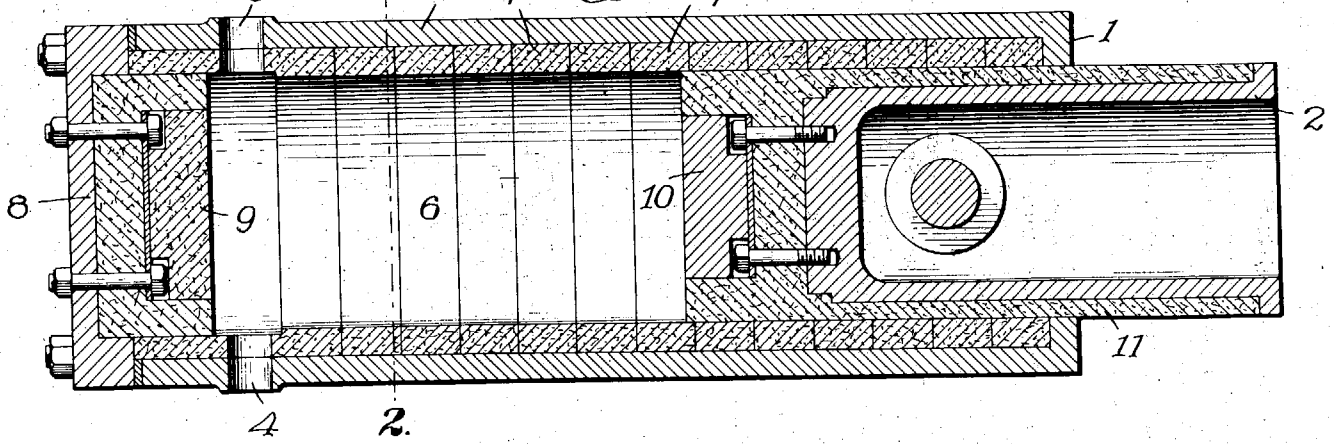
Figure 1 represents in longitudinal section a piston equipped cylinder embodying my invention.
Figure 2:
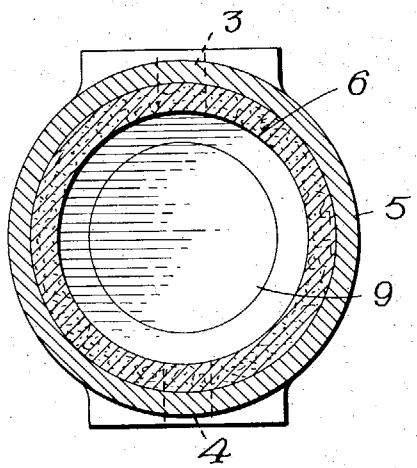
Fig. 2 is a transverse sectional view on the plane of the broken line 2—2, Fig. 1.

Referring to the drawings, 1 denotes, as a whole, a cylinder designed to receive and exhaust, successively, charges of compressed air, or other gas, at the very low temperatures prevailing in refrigeration and liquefaction systems. A piston 2 within the cylinder 1 is operatively connected in the usual manner with any suitable mechanism, not shown, to which the energy imparted to the piston is transferred.

The cylinder 1 has an inlet port 3, through which the charge of compressed air, or other gas, at low temperature, is admitted, when the piston 2 is at the extreme end of its inward movement. The compressed air or other gas within the cylinder is then allowed to expand against the piston to force the latter outwardly, thereby reducing the temperature of the gas and utilizing its expansive energy to perform useful work. When the limit of expansion is reached, the gas is exhausted through the outlet port 4 and, being at a lower temperature than its admission temperature, is available for refrigeration purposes, in the usual manner.

According to my invention, the cylinder 1 consists of a metal shell 5, having an inner lining 6 of a specially constructed material, the essential characteristic of which is its incapacity for rapidly absorbing or rejecting substantial quantities of heat. The lining which I employ, and which constitutes the essential feature of the present invention, consists principally of fibrous material, such as paper, wood fiber, or asbestos fiber, suitably compounded with a strong binder, such as bakelite, and, if desired, with a small amount of graphite, and then molded into rings 7, under high pressure, and with the application of sufficient heat to set the binder.

I may make such a lining as described above by assembling large numbers of thin annuli, made of ordinary manila drawing paper, upon a hollow mandrel, whose outer diameter is slightly less than the diameter of the piston 2. Before these annuli are assembled on the mandrel, they are soaked with a binder, for example liquid bakelite, and one surface may be sprinkled with powdered graphite. The hollow mandrel is then heated by putting its interior space under steam pressure, and the assembled annuli are pressed down upon each other with great force, either in a hydraulic press or by forcing metal rings on the ends of the mandrel toward each other with a series of bolts. The great pressure forces out the superfluous bakelite so that none of it remains except a binding film between each layer of paper. The heat and pressure is maintained for at least twenty-four hours, at the end of which time the materials, namely paper, graphite and binder, have become incorporated into a solid mass. The steam is exhausted from the mandrel, which cools and allows the mass, in the form of a ring, to be withdrawn easily. The ring so formed consists principally of compressed paper fiber, which is easily turned and bored in a lathe and then presents a smooth, dense black surface. This surface has a very low capacity for quickly absorbing or rejecting heat, is practically self-lubricating, and has the peculiar property of becoming stronger and more tenacious when subjected to extreme cold, a property not possessed by compound substances consisting principally of graphite, or those which have not been formed by great pressure under the influence of heat.

Such rings may be made of any predetermined thickness and forced into the metal shell 1 to line the same from end to end.

While I have described one method of making the rings 7 used for lining the metal shell, it is to be understood that I am not limited to the above or any other method of making the lining; obviously, the purposes of my invention are attained by such a lining made in any desired manner, and composed principally of fiber, and a suitable binder, with or without graphite, the substances being compounded under high pressure and with the prolonged application of sufficient heat.

The head 8 of the cylinder is preferably provided also with a similar fibrous plate or covering 9, attached thereto in any suitable manner and having the peculiar properties above described, its constituent substances being compounded under pressure and with the application of heat. The head of the piston or plunger 2 is similarly faced with a fibrous plate or covering 10, attached thereto in any suitable manner, made in substantially the same way, and if desired, the periphery of the piston 2 may have an external covering 11 of the same properties, although the latter is not essential, since the lining 6 and plates 9 and 10, furnish under all circumstances surfaces of requisite incapacity for rapid heat absorption or rejection which completely surround the gases admitted to the engine.

I am aware that linings for cylinders have previously been suggested, composed principally of graphite, in order to avoid the use of ordinary unctuous lubricants, and especially designed to be used with motive fluids which destroy such lubricants, and I am also aware that it has been proposed to mold such graphite into a suitable mass by compounding it with fiber or the like. Therefore, I make no claim to such a lining which, obviously, is wholly unsuited for the particular use described above, as graphite is a substance having considerable capacity for rapidly absorbing heat and having small cohesive strength. My invention resides primarily in the discovery that a lining composed principally of fiber, compounded with a suitable binder preferably under high pressure and with the prolonged application of sufficient heat, with or without the addition of graphite, has its strength and permanence of form, and also its tenacity and durability greatly increased at the extremely low temperatures to which it is subjected in the particular use described above, and it is this property which is essential to the purposes of my invention. Any lining which consists principally of graphite, or which is compounded in the absence of great pressure, accompanied by heat, or in which an unsuitable binder, such as water with a small percentage of fiber, is employed, does not have these properties, and does not moreover attain to them, even under the influence of intense cold, in such degree as to render the substance suitable for the purposes which I have described.

Obviously, as I have stated, the graphite, which may or may not be used in the compound, as desired, is in no way contributory to the attainment of my principal object, but is incorporated for the obvious purpose of providing as far as possible a self-lubricating surface, against which the piston 2 can move with minimum friction.

I claim,

1. In a device of the character described, a cylinder for the expansion of gases at extremely low temperatures, comprising a metallic shell or casing having a lining of low capacity for quickly absorbing or rejecting heat, whereby the interchange of substantial quantities of heat between the gas and the surfaces with which it is in contact during expansion is prevented, said lining consisting principally of fibrous material, compounded with a strong binder by the application of pressure and heat.

2. In a device of the character described, a cylinder for the expansion of gases at extremely low temperatures, comprising a metallic shell or casing having a lining of low capacity for quickly absorbing or rejecting heat, whereby the interchange of substantial quantities of heat between the gas and the surfaces with which it is in contact during expansion is prevented, said lining increasing in hardness and tenacity when subjected to the extremely low temperatures prevailing in said cylinder, and consisting principally of fibrous material, compounded with a small percentage of graphite and a binder, by the application of heat and pressure.

3. In a device of the character described, a cylinder for the expansion of compressed fluids which are gaseous in their free state and which have been previously cooled, for the production of extreme cold, comprising a metallic shell or casing having a lining of low capacity for quickly absorbing or rejecting heat, whereby the absorption of substantial quantities of heat by said shell from the incoming compressed fluid is prevented, said lining consisting principally of fibrous material compounded with a binder.

Dated this thirteenth day of November, 1918.

EBENEZER A. W. JEFFERIES.

Witnesses:
NELLIE WHALEN,
PENELOPE COMBERBACH.